UNITED STATES PATENT OFFICE 2,024,689

PRODUCTION OF CELLULOSE FROM LIGNO-CELLULOSIC MATERIALS

Walter Henry Groombridge and Eric Vernon Mellers, Spondon, near Derby, England, assignors to Celanese Corporation of America, a corporation of Delaware No Drawing. Application January 22, 1935, Serial No. 2,862. In Great Britain February 16, 1934

10 Claims. (Cl. 92—9)

This invention relates to improvements in the production of cellulose from ligno-cellulosic materials, for example wood, straw and grass, by processes in which the lignin is extracted from the ligno-cellulosic materials by means of solvents.

In British Patent No. 416,558 of Henry Dreyfus there is described the extraction of lignin from ligno-cellulosic materials by means of mixtures of polar and non-polar organic liquids or of organic liquids containing groups of differing dipole moment. We have now found that the extracting power of such mixtures may be improved by the addition of water thereto.

According to the invention therefore ligno-cellulosic materials are treated with mixtures comprising water, an organic liquid whose molecules possess substantially zero dipole moment, and an organic liquid with dipolar molecules, or comprising water and two or more organic liquids whose molecules contain groups of differing dipole moment.

The term "solvent mixture" is employed in the specification and claims does not include a mixture comprising a substance which enters into chemical combination with lignin as do the phenols, nor does it include an agent derived during the extraction process from the ligno-cellulosic materials.

The organic solvents employed may belong to widely different classes of organic liquids, for example alcohols, particularly alcohols boiling below about 120° C. such as ethyl alcohol; ketones, e. g. acetone, methyl ethyl ketone, and higher ketones, cyclic ketones such as cyclohexanone, methyl cyclohexanone, tetrahydropyrone (1.4-oxanone) and their homologues and substitution products or other ketonic substances, e. g. pyruvic acid and diacetone alcohol; aldehydes, and especially aromatic aldehydes; liquid organic acids, and especially acetic acid and other lower fatty acids; esters of organic carboxylic acids, and especially of the lower fatty acids, e. g. methyl or ethyl formate or acetate; ethers, e. g. diethyl ether, ethyl propyl ether, di-isopropyl ethers and cyclic ethers such as dioxane, methylene ethylene ether and homologues of these cyclic ethers, for instance dimethyl dioxane; polar or non-polar halogenated hydrocarbons, for instance carbon tetrachloride, hexa-chlor-ethane, methylene chloride, ethylene chloride, trichlorethylene, dichlorethylene and the like; and hydrocarbons and especially the aromatic or other cyclic hydrocarbons, for instance benzene, toluene, xylene and their hydrogenation products, for example hexa-hydrobenzene and other cyclic hydrocarbons, for instance tetra- or deca-hydro-naphthalene.

Generally it is preferred in the mixtures containing water and two or more organic solvents to have present at least one organic solvent which is soluble in water. The mixture of the water with the two organic liquids of different polarities is preferably, but not essentially, homogeneous.

We may, for example, employ mixtures of water with alcohols, ketones, aldehydes, esters or acids and with non-polar organic solvents, for example benzene, toluene, xylene or other hydrocarbons, carbon tetrachloride, hexachlorethane and similar non-polar halogenated hydrocarbons. Again, mixtures of water with strongly polar organic liquids such as alcohols, ketones, aldehydes, esters or acids and with less strongly polar liquids such as the ethers, for example diethyl ether and di-isopropyl ether, may be used. Again, mixtures of water with three or more organic liquids having different polarities may be employed, for instance mixtures of water with acetone or methyl ethyl ketone or other ketones, and ethers such as di-isopropyl ether and hydrocarbons or other nonpolar halogenated hydrocarbons or mixtures of water with ketones, for example acetone or methyl ethyl ketone, and cyclic ethers, for instance dioxane and hydrocarbons or other non-polar solvents. Thus we may employ a mixture of 45 parts of alcohol, 45 parts of water, and 10 parts of benzene, though preferably the mixture is so proportioned that it is homogeneous, for example 65 parts of alcohol, 25 parts of water and 10 parts of benzene; or we may employ acetone, alcohol and water in widely varying proportions, the mixture preferably containing 30–60% of water, the remainder being a mixture of acetone and alcohol in proportions of 20–80% of acetone and 80–20% of alcohol. Thus a mixture of 15 parts of acetone, 35 parts of water and 50 parts of alcohol is very suitable.

The mixtures employed in accordance with the present invention are particularly suitable for the extraction of the lignin from the more resistant woods or other ligno-cellulosic materials.

The ligno-cellulosic material is preferably subjected to the action of the solvent mixtures while in a finely divided form. For example wood may advantageously be employed in the form of chips or even of a mechanical pulp. The treatment is effected at a temperature considerably higher than atmospheric, and especially temperatures above 100° C. for example temperatures between 150 and 220° C. or 240° C. and especially temperatures of the order of 180-200° C. The process may be carried out under constant volume conditions, for example in closed digesters or other vessels so that the pressure automatically adjusts itself to the temperature employed; or pressures in excess of those generated by the vapour of the solvent mixture at the temperatures employed for the extraction may be employed. Such a pressure may be produced by means of nitrogen or other inert gas and may be of the order of 5, 10, 20, or 40 atmospheres or more in excess of the pressure produced by the solvent vapours.

It is desirable to ensure a thorough impregnation of the material by the solvent mixture. Thus, although the material may be simply boiled or agitated with the solvent mixture under the conditions of temperature and pressure described above, it is preferable to aid the impregnation, for example by first partially evacuating the digester or other vessel containing the material and then introducing the solvent mixture into the evacuated vessel and if desired subjecting the material and solvent mixture to a pressure higher than atmospheric. The use of pressure for the treatment itself also assists in procuring a thorough impregnation. Other methods may be used to attain the same end, for example, the sudden release of pressure within the materials, whereby the active surface of the materials is increased to a very large extent. As described in U. S. Patent No. 1,996,797, such a process may be carried out by causing the sudden vaporization of a liquid within the material. Any other method of securing an efficient contact between the material and the solvent mixture may be employed.

The treatment of the ligno-cellulosic material with the solvent mixture may be effected in a single stage or two or multi-stage process and in a continuous or discontinuous manner. For example the extraction may be performed in digesters or vessels such as are commonly employed in pulping processes, for example in the sulphite process. In another method of carrying out the invention the material may be subjected to a continuous extraction with the solvent mixture. For example the material may be caused to travel through a reaction vessel in a direction counter to that of a stream of solvent mixture. In any case the solvent mixture may, after the treatment, be freed from lignin and other substances and returned to the process. For example the solvent mixture may be distilled off, leaving the lignin and other substances in the solid form.

If desired the ligno-cellulosic material may be subjected to other treatments prior to extraction by the process of the present invention, for example to treatments to remove resins. Thus, the simple extraction of the resins with benzen or benzene-alcohol mixtures may be applied. However, the resins are usually quite readily extracted in the process of the present invention, and such a procedure is generally unnecessary unless the lignin is required in a more or less purified form.

The cellulose produced by the process of the present invention may be employed, if desired after any other treatment, for any of the purposes for which cellulose is used, for example for the manufacture of cellulose ethers, cellulose nitrate or cellulose xanthate, or for the manufacture of paper, especially the better classes of paper, or for the manufacture of other cellulose derivatives.

In the case of the manufacture of cellulose acetate or other organic derivatives of cellulose, it is advantageous to apply a pretreatment before carrying out the esterification process. Thus, the extracted cellulose may be subjected to treatment with lower fatty acids if a lower fatty acid has not already been employed in the extraction process. Again, a two-stage pretreatment may be applied such as that described in U. S. Patent No. 1,711,110 involving a preliminary treatment with hot dilute alkali or with cold strong alkali followed by a treatment with an organic acid and particularly a lower fatty acid.

The following examples illustrate the invention:—

Example 1

Wood chips are sprayed with their own weight of a mixture of 30 parts of concentrated hydrochloric acid and 70 parts of glacial acetic acid and are allowed to remain at atmospheric temperature for 6 hours. After this period the material is washed thoroughly with water. It is then mixed with 8-10 times its weight of a mixture comprising 15 parts by volume of acetone, 35 parts of water and 50 parts of alcohol in an autoclave. The contents of the autoclave are heated to a temperature of 180° to 200° C. for 2 to 3 hours, after which the solvent may be withdrawn, preferably without reducing the pressure, and further solvent introduced. The extraction may thus be carried out in stages and is generally complete after digestion with the solvent mixture for about 6-9 hours. In the second or later stages of the extraction the temperature may be increased somewhat, for example to about 210°-220° C. The cellulosic material remaining after the extraction may be washed with water or with the solvent mixture and may be subjected to any desired bleaching or similar treatment.

Example 2

Wood chips are treated in an autoclave with about 10 times their weight of a mixture comprising 65 parts by volume of ethyl alcohol, 25 parts of water and 10 parts of benzene. The extraction is carried out in stages as described in Example 1, the temperature being raised from about 180° C. to about 200° C. as the extraction proceeds.

Example 3

Wood chips are treated as in Example 2 with the exception that as the extracting agent there is used a mixture of 50 parts dioxane, 30 parts of water and 20 parts of acetone.

What we claim and desire to secure by Letters Patent is:—

1. Process for the production of cellulose from lignocellulosic materials, which comprises extracting the materials at an elevated temperature with a solvent mixture containing a substantial proportion of water and containing at least two organic liquids which are chemically inert towards lignin and which have substantially different dipole moments due to the presence in the molecules of groups of different type.

2. Process for the production of cellulose from lignocellulosic materials, which comprises extracting the materials at an elevated temperature with a solvent mixture containing at least 25% by volume of water and containing at least two organic liquids which are chemically inert towards lignin and which have substantially different dipole moments due to the presence in the molecules of groups of different type.

3. Process for the production of cellulose from lignocellulosic materials, which comprises extracting the materials at an elevated temperature with a homogeneous solvent mixture containing a substantial proportion of water and containing at least two organic liquids which are chemically inert towards lignin and which have substantially different dipole moments due to the presence in the molecule of groups of different type.

4. Process for the production of cellulose from lignocellulosic materials, which comprises extracting the materials at a temperature of the order of 150°–240° C. with a solvent mixture containing a substantial proportion of water and containing at least two organic liquids which are chemically inert towards lignin and which have substantially different dipole moments due to the presence in the molecule of groups of different type.

5. Process according to claim 4 in which the extraction is effected under a pressure higher than the vapor pressure of the solvent mixture employed.

6. Process for the production of cellulose from lignocellulosic materials, which comprises extracting the materials at a temperature of the order of 150°–240° C. with a homogeneous solvent mixture containing at least 25% by volume of water and containing a non-polar and a polar organic liquid, both of which are chemically inert towards lignin.

7. Process for the production of cellulose from lignocellulosic materials, which comprises extracting the materials at a temperature of the order of 150°–240° C. with a homogeneous solvent mixture containing at least 25% by volume of water and containing an aromatic hydrocarbon and an aliphatic alcohol.

8. Process for the production of cellulose from lignocellulosic materials, which comprises extracting the materials at a temperature of the order of 150°–240° C. with a homogeneous solvent mixture containing at least 25% by volume of water and containing benzene and ethyl alcohol.

9. Process for the production of cellulose from lignocellulosic materials, which comprises extracting the materials at a temperature of the order of 150°–240° C. with a homogeneous solvent mixture containing at least 25% by volume of water and containing an aliphatic ketone and an aliphatic alcohol.

10. Process for the production of cellulose from lignocellulosic materials, which comprises extracting the materials at a temperature of the order of 150°–240° C. with a homogeneous solvent mixture containing at least 25% by volume of water and containing acetone and ethyl alcohol.

WALTER HENRY GROOMBRIDGE.
ERIC VERNON MELLERS.